United States Patent
Kato (10) Patent No.: US 7,324,293 B2
(45) Date of Patent: Jan. 29, 2008

(54) WIDE-ANGLE LENS SYSTEM

(75) Inventor: Koji Kato, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/677,682

(22) Filed: Feb. 22, 2007

(65) Prior Publication Data
US 2007/0201140 A1 Aug. 30, 2007

(30) Foreign Application Priority Data
Feb. 24, 2006 (JP) .............................. 2006-047922

(51) Int. Cl.
G02B 13/04 (2006.01)
G02B 9/00 (2006.01)
(52) U.S. Cl. ................. 359/751; 359/749; 359/754
(58) Field of Classification Search ............... 359/749, 359/751, 753, 754
See application file for complete search history.

(56) References Cited

U.S. PATENT DOCUMENTS

| 5,790,324 | A | 8/1998 | Park |
| 6,924,947 | B2 | 8/2005 | Saori |
| 7,106,520 | B2 | 9/2006 | Saori |
| 2007/0002456 | A1 | 1/2007 | Saori |
| 2007/0002457 | A1 | 1/2007 | Saori |
| 2007/0002458 | A1 | 1/2007 | Saori |
| 2007/0201141 | A1* | 8/2007 | Kato et al. ............ 359/680 |

FOREIGN PATENT DOCUMENTS

| JP | 62-168108 | 7/1987 |
| JP | 7-261076 | 10/1995 |
| JP | 10-031153 | 2/1998 |

OTHER PUBLICATIONS

English Language Abstract of JP 7-261076.
U.S. Appl. No. 11/677,713 to Kato et al., filed Feb. 22, 2007.

\* cited by examiner

*Primary Examiner*—David N. Spector
(74) *Attorney, Agent, or Firm*—Greenblum & Bernstein, P.L.C.

(57) ABSTRACT

A wide-angle lens system includes a negative front lens group and a positive rear lens group, in this order from the object.

The negative front lens group includes a negative first sub-lens group and a positive second sub-lens group, in this order from the object.

The positive rear lens group includes cemented lens elements having a positive R1 lens element and a negative R2 lens element, a positive R3 lens element having a convex surface facing toward the image, and a positive R4 lens element, in this order from the object.

The wide-angle lens system satisfies the following conditions:

$$-0.8 < f1a/f1b < -0.1 \quad (1)$$

$$0.6 < f/fR < 1.1 \quad (2)$$

wherein
f1a designates the focal length of the negative first sub-lens group;
f1b designates the focal length of the positive second sub-lens group;
f designates the focal length of the entire wide-angle lens system; and
fR designates the focal length of the positive rear lens group.

8 Claims, 6 Drawing Sheets

WIDE-ANGLE LENS SYSTEM

BACKGROUND OF THE INVENTION

1. Field of the Invention

The present invention relates to a wide-angle lens system suitable for a digital single-lens reflex (SLR) camera.

2. Description of the Prior Art

Retrofocus lens systems having a negative lens group and a positive lens group, in this order from the object, have been widely employed as wide-angle lens systems for single-lens reflex cameras which require a relatively long back focal distance with respect to the focal length. Various retrofocus lens systems have been proposed in regard to optical power distribution, lens arrangement and the size arrangement, etc., as shown in, e.g., Japanese Unexamined Patent Publication No. H10-31153.

SUMMARY OF THE INVENTION

The present invention provides a high quality retrofocus wide-angle lens system with the following features:
   (i) being thin (miniaturized) in the optical axis direction;
   (ii) coma, distortion and chromatic aberration are suitably corrected; and
   (iii) achieving an angle-of-view of approximately 70°.

According to an aspect of the present invention, there is provided a wide-angle lens system including a front lens group having a negative refractive power (hereinafter, a negative front lens group) and a rear lens group having a positive refractive power (hereinafter, a positive rear lens group), in this order from the object.

The negative front lens group includes a negative first sub-lens group and a positive second sub-lens group, in this order from the object.

The positive rear lens group includes cemented lens elements having a positive R1 lens element and a negative R2 lens element, a positive R3 lens element having a convex surface facing toward the image, and a positive R4 lens element, in this order from the object.

The wide-angle lens system satisfies the following conditions:

$$-0.8 < f1a/f1b < -0.1 \quad (1)$$

$$0.6 < f/fR < 1.1 \quad (2)$$

wherein
f1a designates the focal length of the negative first sub-lens group;
f1b designates the focal length of the positive second sub-lens group;
f designates the focal length of the entire wide-angle lens system; and
fR designates the focal length of the positive rear lens group.

The wide-angle lens system preferably satisfies the following condition:

$$-0.7 < fR/fF < -0.1 \quad (3)$$

wherein
fF designates the focal length of the negative front lens group; and
fR designates the focal length of the positive rear lens group.

The negative first sub-lens group preferably includes one positive lens element and one negative lens element, and likewise, the positive second sub-lens group includes one positive lens element and one negative lens element.

In the negative first sub-lens group, the positive lens element and the negative lens element are preferably arranged in this order from the object.

In the positive second sub-lens group, the negative lens element and the positive lens element are preferably arranged in this order from the object.

More specifically, the negative first sub-lens group can be constituted by a positive F1 lens element (the positive lens element) having a convex surface facing toward the object and a negative F2 lens element (the negative lens element), in this order from the object; and the positive second sub-lens group can be constituted by a negative F3 lens element (the negative lens element) having a convex surface facing toward the object and a positive F4 lens element (the positive lens element), in this order from the object.

In the positive rear lens group, the positive R3 lens element having the convex surface facing toward the image preferably satisfies the following condition:

$$vd1\text{-}7 > 70 \quad (4)$$

wherein
vd1-7 designates the Abbe number of the positive R3 lens element having the convex surface facing toward the image.

The wide-angle lens system preferably satisfies the following condition:

$$0.1 < d/f < 0.35 \quad (5)$$

wherein
d designates the axial distance between the negative front lens group and the positive rear lens group.

A diaphragm is preferably provided between the negative front lens group and the positive rear lens group.

The present disclosure relates to subject matter contained in Japanese Patent Application No. 2006-47922 (filed on Feb. 24, 2006) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

The wide-angle lens system of the present invention, as shown in the embodiments of FIGS. 1, 3, 5, 7, 9 and 11, includes a negative front lens group 10, a diaphragm S and a positive rear lens group 20, in this order from the object.

The negative front lens group 10 includes a negative first sub-lens group 11 and a positive second sub-lens group 12, in this order from the object.

The negative front lens group 10 is constituted by four lens elements; and the four lens elements are divided into the negative first sub-lens group 11 and the positive second sub-lens group 12 respectively include a positive lens element and a negative lens element.

The negative first sub-lens group 11 is constituted by a positive F1 lens element having a convex surface facing toward the object and a negative F2 lens element, in this order from the object; and the positive second sub-lens group 12 is constituted by a negative F3 lens element having a convex surface facing toward the object and a positive F4 lens element, in this order from the object.

The positive rear lens group 20 includes cemented lens elements having a positive R1 lens element and a negative R2 lens element, a positive R3 lens element having a convex surface facing toward the image, and a positive R4 lens element, in this order from the object. Note that the refractive power of the entire cemented lens elements (the positive R1 lens element and the negative R2 lens element) is negative.

A retrofocus lens system generally achieves a longer back focal distance than the focal length of the entire lens system. Consequently, the refractive power distribution is asymmetrical with respect to the diaphragm (S). Accordingly, if an attempt is made to shorten the entire lens system, while the necessary back focal distance is maintained, the correcting of aberrations such as distortion, astigmatism and spherical aberration, etc., becomes difficult.

The negative front lens group 10 is constituted by a plurality of lens elements including at least one positive lens element in order to reduce the occurrence of distortion therein. On the other hand, since the refractive power of the negative front lens group 10 is negative, at least one negative lens element is provided therein; accordingly, the correcting of astigmatism, distortion and chromatic aberration can be made. Furthermore, by providing a relatively thick positive lens element in the vicinity of the object-side of the diaphragm S, distortion can be adequately corrected.

In the positive rear lens group 20, in order to correct spherical aberration which occurs in the entire wide-angle lens system, while the wide-angle lens system is arranged to maintain influence to off-axis aberrations as minimum as possible, at least one negative lens element which generates negative spherical aberration is provided.

Furthermore, in order to reduce the occurrence of spherical aberration and that of coma, at least three positive lens elements are provided in the positive rear lens group 20.

Still further, by providing a positive lens element on each side of the negative lens element (of the positive rear lens group 20), and by bonding the most diaphragm-side positive lens element to the negative lens element (so as to form the aforementioned cemented lens elements), spherical aberration of higher order can be adequately corrected.

Condition (1) specifies the ratio of the focal length of the negative first sub-lens group 11 to that of the positive second sub-lens group 12 of the negative front lens group 10, and is for correcting field curvature in particular, i.e., condition (1) relates to the distribution of refractive power over the negative first sub-lens group 11 and the positive second sub-lens group 12.

If f1a/f1b exceeds the upper limit of condition (1), field curvature occurs in the negative direction.

If f1a/f1b exceeds the lower limit of condition (1), field curvature occurs in the positive direction.

As an alternative, if the lower limit of condition (1) is set to −0.6 (i.e., −0.6<f1a/f1b<−0.1 . . . (1')), the more improved correction of field curvature can be attained.

Condition (2) specifies the refractive power of the positive rear lens group 20.

If the positive refractive power of the positive rear lens group 20 becomes stronger to the extent that f/fR exceeds the upper limit of condition (2), it becomes difficult to correct spherical aberration.

If the positive refractive power of the positive rear lens group 20 becomes weaker to the extent that f/fR exceeds the lower limit of condition (2), astigmatism worsens (increases), and the correcting thereof becomes difficult.

As an alternative, if the lower limit of condition (2) is set to 0.7 (i.e., 0.7<f/fR<1.1 . . . (2')), the more improved correction of aberrations can be attained.

Condition (3) specifies the ratio of the focal length of the negative front lens group 10 to that of the positive rear lens group 20, i.e., condition (3) relates to the balance of the refractive-power distribution over the negative front lens group 10 and the positive rear lens group 20.

If the positive refractive power of the positive rear lens group 20 becomes stronger to the extent that fR/fF exceeds the upper limit of condition (3), the diameter of the negative front lens group 10 becomes larger. Consequently, spherical aberration worsens (increases), and the back focal distance becomes insufficient (not long enough).

If the negative refractive power of the negative front lens group 10 becomes stronger to the extent that fR/fF exceeds the lower limit of condition (3), field curvature and astigmatism both worsen (increase), and the correcting thereof becomes difficult.

As an alternative, if the upper limit of condition (3) is set to −0.3 (i.e., −0.7<fR/fF<−0.3 . . . (3')), the much more improved correction of aberrations can be attained.

Condition (4) specifies the Abbe number of a glass material of the positive R3 lens element in the positive rear lens group 20.

If the positive R3 lens element is made of a material having the Abbe number of vd1-7 exceeding lower limit of condition (4), the correcting of axial chromatic aberration and lateral chromatic aberration becomes difficult.

Condition (5) specifies the distance between the negative front lens group 10 and the positive rear lens group 20.

If d/f exceeds the upper limit of condition (5), the overall length of the wide-angle lens system becomes longer, and miniaturization of the wide-angle lens system becomes difficult.

If d/f exceeds the lower limit of condition (5), the correcting of field curvature and astigmatism becomes difficult.

Specific numerical data of the embodiments will be described hereinafter.

In the diagrams of spherical aberration and the sine condition, SA designates spherical aberration, and SC designates the sine condition.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, y designates the image height, and the two types of dotted lines respectively indicate magnification with respect to the g and C lines; however, the d line as the base line coincides with the ordinate.

In the diagrams of astigmatism, y designates the image height, S designates the sagittal image, and M designates the meridional image.

In the diagrams of distortion, y designates the image height.

The tables, FNO. designates the F-number, f designates the focal length of the entire zoom lens system, W designates the half angle-of-view (°), fB designates the back focal distance, r designates the radius of curvature, d designates the lens-element thickness or a distance between lens elements (lens groups) which is variable upon zooming, $N_d$ designates the refractive index of the d-line, and ν designates the Abbe number. The values for the distance "d" are indicated in the order of the short focal length extremity, an intermediate focal length and the long focal length extremity.

In addition to the above, an aspherical surface which is symmetrical with respect to the optical axis is defined as follows:

$$x = cy^2/(1+[1-\{1+K\}c^2y^2]^{1/2}) + A4y^4 + A6y^6 + A8y^8 + A10y^{10} \ldots$$

wherein:
c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

Embodiment 1

Figure 1:
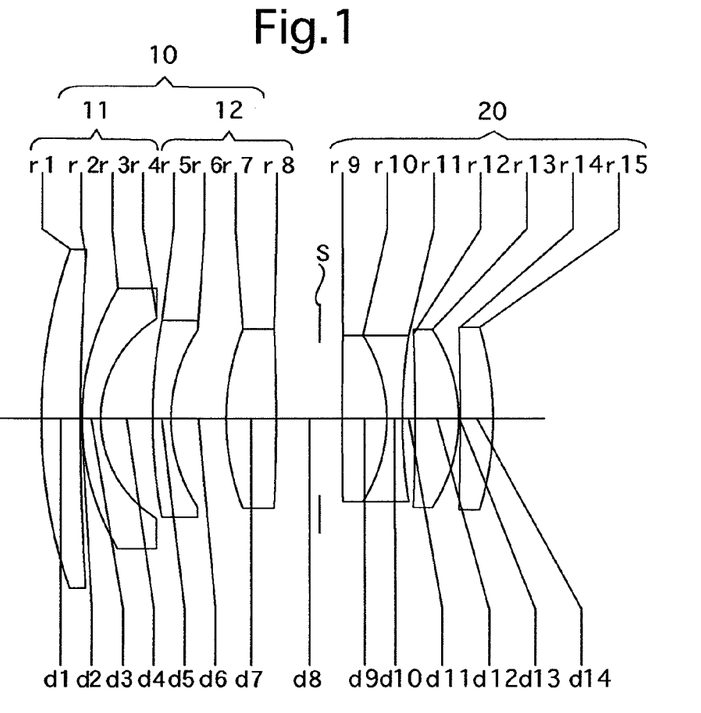
FIG. 1 is a lens arrangement of the wide-angle lens system according to a first embodiment of the present invention.
Figure 2A:
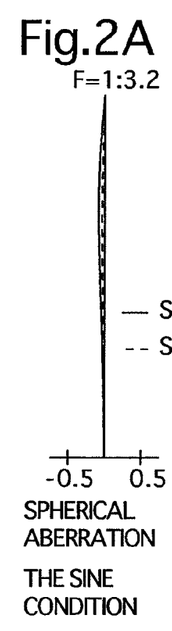
FIGS. 2A, 2B, 2C, 2D and 2E show aberrations occurred in the lens arrangement shown in FIG. 1.
Figure 2B:
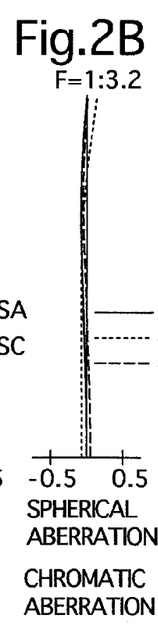
Figure 2C:
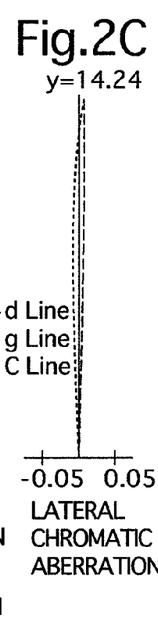
Figure 2D:
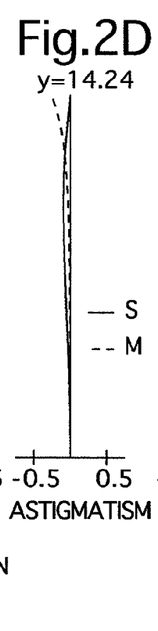
Figure 2E:
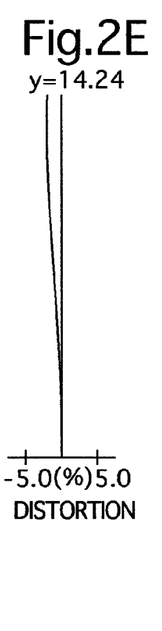

FIG. 1 is the lens arrangement of the wide-angle lens system according to the first embodiment. FIGS. 2A, 2B, 2C, 2D and 2E show aberrations occurred in the lens arrangement shown in FIG. 1.

Table 1 shows the numerical data of the first embodiment when an object at infinity is in an in-focus state.

The wide-angle lens system of the first embodiment includes a negative front lens group 10, a diaphragm S and a positive rear lens group 20, in this order from the object.

The negative front lens group 10 includes a negative first sub-lens group 11 and a positive second sub-lens group 12, in this order from the object.

The negative first sub-lens group 11 includes a positive meniscus lens element (a positive F1 lens element) having the convex surface facing toward the object and a negative meniscus lens element (a negative F2 lens element) having the convex surface facing toward the object, in this order from the object.

The positive second sub-lens group 12 includes a negative meniscus lens element (a negative F3 lens element) having the convex surface facing toward the object and a positive biconvex lens element (a positive F4 lens element), in this order from the object.

The positive rear lens group 20 includes cemented lens elements having a positive biconvex lens element (a positive R1 lens element) and a negative biconcave lens element (a negative R2 lens element), a positive meniscus lens element (a positive R3 lens element) having the convex surface facing toward the image, and a positive meniscus lens element (a positive R4 lens element) having the convex surface facing toward the image, in this order from the object.

The diaphragm S is provided 2.79 behind the positive second sub-lens group 12 (surface No. 8).

TABLE 1

F = 1:3.3
f = 20.60
W = 35.2
fB = 37.80

| Surf. No. | r | d | Nd | ν |
|---|---|---|---|---|
| 1 | 34.251 | 2.51 | 1.58667 | 55.1 |
| 2 | 176.873 | 0.10 | — | — |
| 3 | 16.734 | 1.20 | 1.80015 | 47.0 |
| 4 | 7.655 | 3.37 | — | — |
| 5 | 34.173 | 1.20 | 1.80400 | 46.6 |
| 6 | 10.493 | 3.56 | — | — |
| 7 | 16.332 | 3.24 | 1.79614 | 25.4 |
| 8 | −117.039 | 4.28 | — | — |
| 9 | 345.109 | 2.92 | 1.54026 | 46.4 |
| 10 | −10.178 | 1.00 | 1.80699 | 28.7 |
| 11 | 36.388 | 0.82 | — | — |
| 12 | −130.278 | 2.79 | 1.49700 | 81.6 |
| 13 | −10.689 | 0.10 | — | — |
| 14 | −236.485 | 2.11 | 1.71345 | 54.5 |
| 15 | −20.380 | — | — | — |

Embodiment 2

Figure 3:
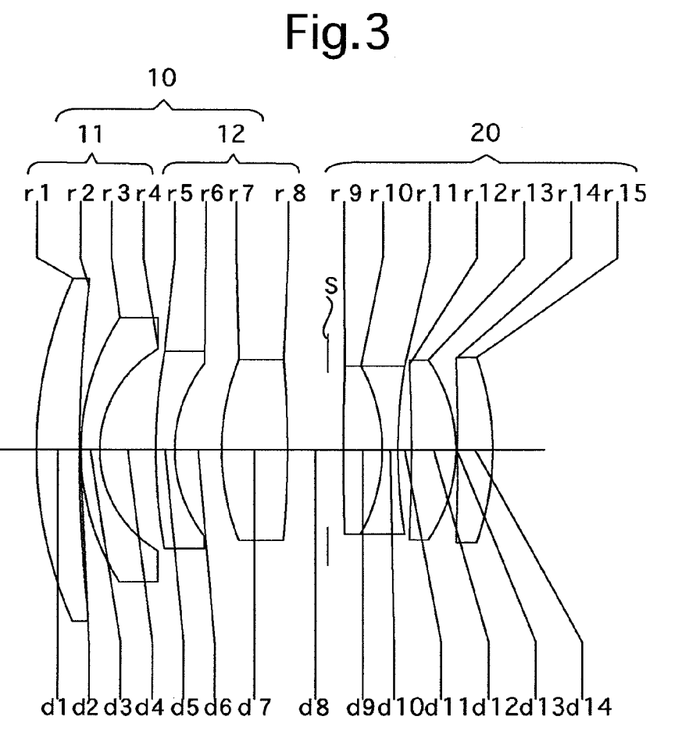
FIG. 3 is a lens arrangement of the wide-angle lens system according to a second embodiment of the present invention.
Figures 4A, 4B, 4C:
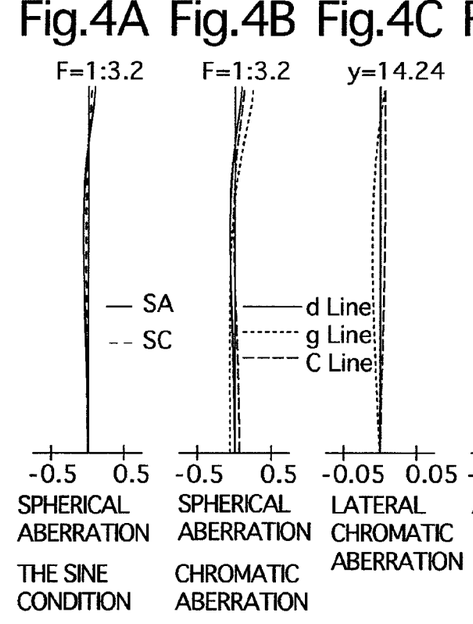
FIGS. 4A, 4B, 4C, 4D and 4E show aberrations occurred in the lens arrangement shown in FIG. 3.
Figures 4D, 4E:
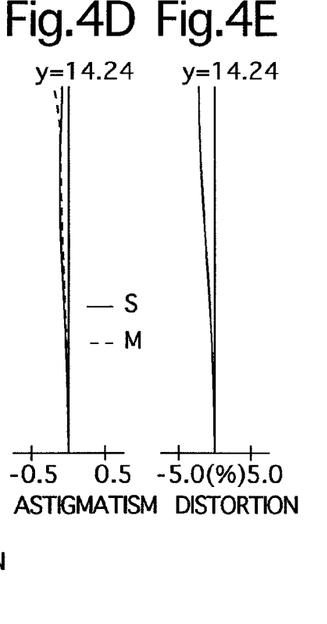

FIG. 3 is the lens arrangement of the wide-angle lens system according to the second embodiment. FIGS. 4A, 4B, 4C, 4D and 4E show aberrations occurred in the lens arrangement shown in FIG. 3.

Table 2 shows the numerical data of the second embodiment when an object at infinity is in an in-focus state.

The basic lens arrangement of the second embodiment is the same as that of the first embodiment.

The diaphragm S is provided 2.59 behind the positive second sub-lens group 12 (surface No. 8).

TABLE 2

F = 1:3.3
f = 20.60
W = 35.2
fB = 37.80

| Surf. No. | r | d | Nd | ν |
|---|---|---|---|---|
| 1 | 27.251 | 2.76 | 1.58640 | 48.4 |
| 2 | 97.504 | 0.10 | — | — |
| 3 | 15.993 | 1.20 | 1.77000 | 49.0 |
| 4 | 7.599 | 3.54 | — | — |
| 5 | 37.038 | 1.20 | 1.80400 | 46.6 |
| 6 | 9.052 | 3.04 | — | — |
| 7 | 15.781 | 4.25 | 1.75692 | 26.8 |
| 8 | −64.512 | 3.58 | — | — |
| 9 | 172.756 | 2.51 | 1.54001 | 46.4 |
| 10 | −11.089 | 1.00 | 1.80700 | 28.0 |
| 11 | 34.342 | 0.87 | — | — |
| 12 | −105.548 | 2.82 | 1.48749 | 70.2 |
| 13 | −10.386 | 0.10 | — | — |
| 14 | −167.462 | 2.21 | 1.65000 | 57.2 |
| 15 | −18.013 | — | — | — |

Embodiment 3

Figure 5:
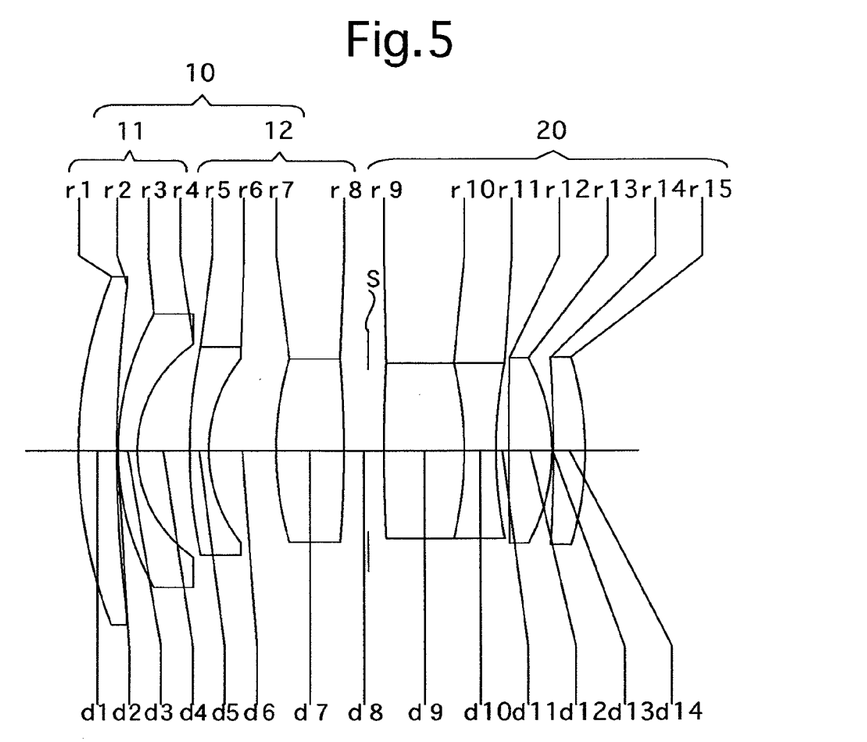
FIG. 5 is a lens arrangement of the wide-angle lens system according to a third embodiment of the present invention.
Figures 6A, 6B:
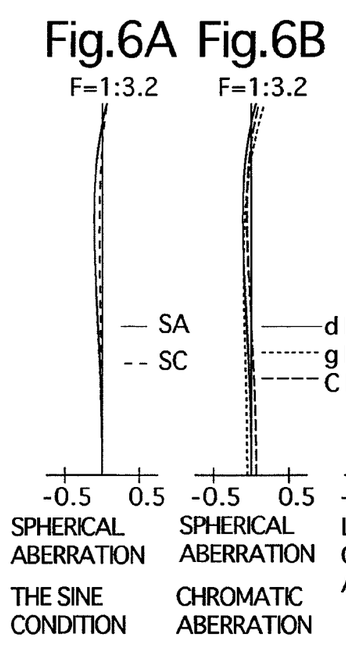
FIGS. 6A, 6B, 6C, 6D and 6E show aberrations occurred in the lens arrangement shown in FIG. 5.
Figure 6C:
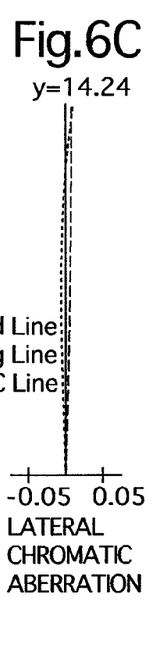
Figure 6D:
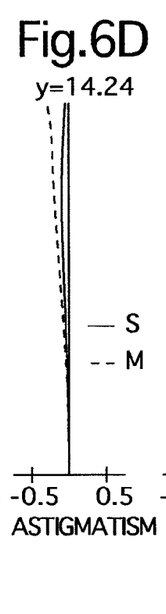
Figure 6E:
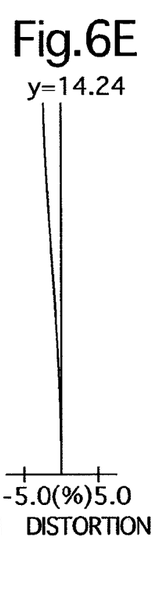

FIG. 5 is the lens arrangement of the wide-angle lens system according to the third embodiment. FIGS. 6A, 6B, 6C, 6D and 6E show aberrations occurred in the lens arrangement shown in FIG. 5.

Table 3 shows the numerical data of the third embodiment when an object at infinity is in an in-focus state.

The positive rear lens group 20 includes cemented lens elements having a positive biconvex lens element (a positive R1 lens element) and a negative biconcave lens element (a negative R2 lens element), a positive biconvex lens element (a positive R3 lens element), and a positive meniscus lens element (a positive R4 lens element) having the convex surface facing toward the image, in this order from the object.

The remaining lens arrangement of the third embodiment is the same as that of the first embodiment.

The diaphragm S is provided 1.55 behind the positive second sub-lens group 12 (surface No. 8).

TABLE 3

F = 1:3.3
f = 20.60
W = 35.3
fB = 37.80

| Surf. No. | r | d | Nd | ν |
|---|---|---|---|---|
| 1 | 29.999 | 2.43 | 1.66672 | 48.3 |
| 2 | 83.360 | 0.10 | — | — |
| 3 | 17.736 | 1.20 | 1.77250 | 49.6 |
| 4 | 8.210 | 3.30 | — | — |
| 5 | 32.129 | 1.20 | 1.77250 | 49.6 |
| 6 | 9.492 | 4.20 | — | — |
| 7 | 20.295 | 4.30 | 1.76182 | 26.5 |
| 8 | −70.229 | 2.55 | — | — |
| 9 | 113.064 | 5.07 | 1.58313 | 59.4 |
| 10 | −23.796 | 2.00 | 1.80518 | 25.4 |
| 11 | 28.503 | 0.81 | — | — |
| 12 | 460.778 | 2.72 | 1.48749 | 70.2 |
| 13 | −12.264 | 0.10 | — | — |
| 14 | −84.271 | 1.98 | 1.69680 | 55.5 |
| 15 | −20.250 | — | — | — |

Embodiment 4

Figure 7:
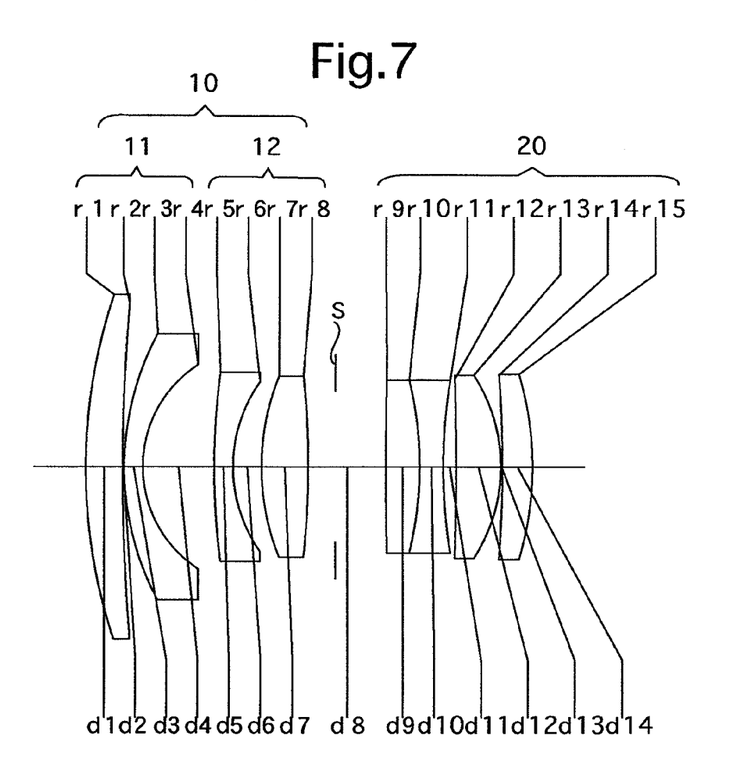
FIG. 7 is a lens arrangement of the wide-angle lens system according to a fourth embodiment of the present invention.
Figure 8A:
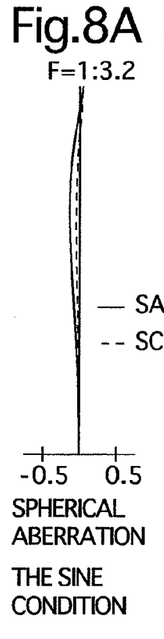
FIGS. 8A, 8B, 8C, 8D and 8E show aberrations occurred in the lens arrangement shown in FIG. 7.
Figures 8B, 8C, 8D, 8E:
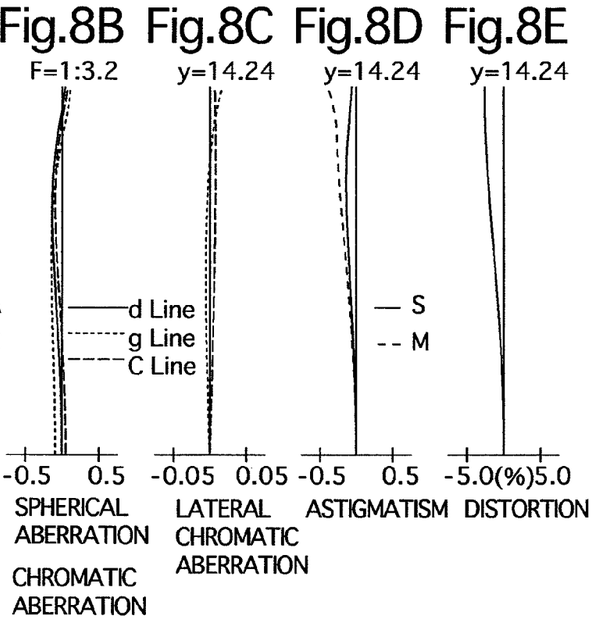

FIG. 7 is the lens arrangement of the wide-angle lens system according to the fourth embodiment. FIGS. 8A, 8B, 8C, 8D and 8E show aberrations occurred in the lens arrangement shown in FIG. 7.

Table 4 shows the numerical data of the fourth embodiment when an object at infinity is in an in-focus state.

The basic lens arrangement of the fourth embodiment is the same as that of the first embodiment.

The diaphragm S is provided 1.70 behind the positive second sub-lens group 12 (surface No. 8).

TABLE 4

F = 1:3.3
f = 20.60
W = 35.4
fB = 37.80

| Surf. No. | r | d | Nd | ν |
|---|---|---|---|---|
| 1 | 35.085 | 2.36 | 1.66672 | 48.3 |
| 2 | 132.629 | 0.10 | — | — |
| 3 | 17.984 | 1.20 | 1.77800 | 47.4 |
| 4 | 7.824 | 4.57 | — | — |
| 5 | 46.388 | 1.20 | 1.78800 | 47.4 |
| 6 | 9.486 | 1.81 | — | — |
| 7 | 15.715 | 2.93 | 1.76182 | 26.5 |
| 8 | −54.289 | 4.94 | — | — |
| 9 | 247.462 | 2.18 | 1.58313 | 59.4 |
| 10 | −22.838 | 1.50 | 1.80518 | 25.4 |
| 11 | 34.590 | 0.82 | — | — |
| 12 | −192.776 | 2.87 | 1.49700 | 81.6 |
| 13 | −10.720 | 0.10 | — | — |
| 14 | −74.221 | 1.94 | 1.69680 | 55.5 |
| 15 | −20.527 | — | — | — |

Embodiment 5

Figure 9:
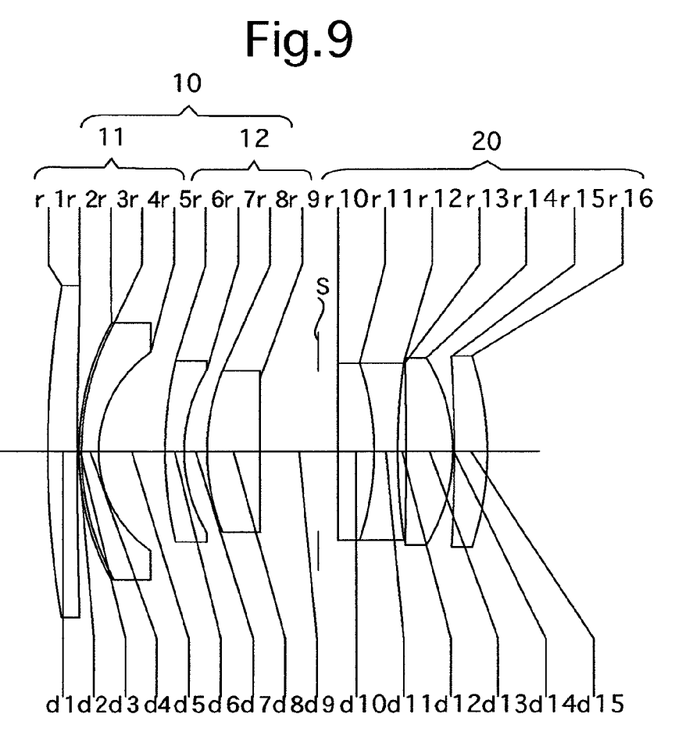
FIG. 9 is a lens arrangement of the wide-angle lens system according to a fifth embodiment of the present invention.
Figures 10A, 10B, 10C:
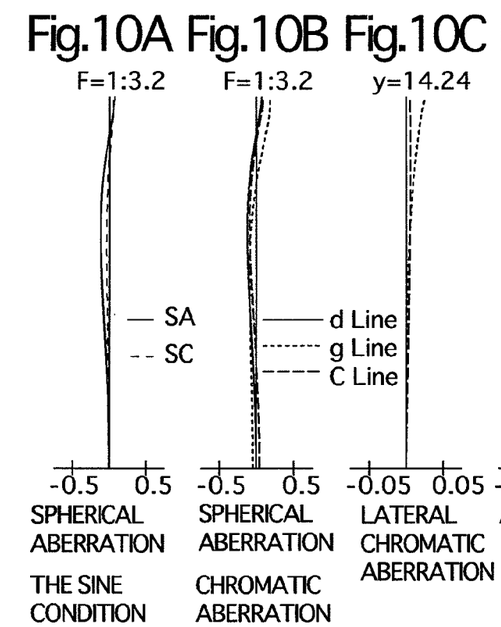
FIGS. 10A, 10B, 10C, 10D and 10E show aberrations occurred in the lens arrangement shown in FIG. 9.
Figures 10D, 10E:
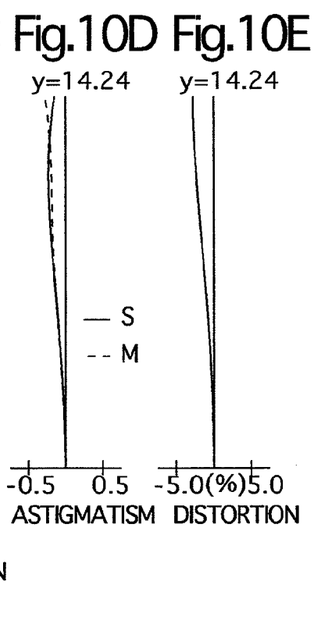

FIG. 9 is the lens arrangement of the wide-angle lens system according to the fifth embodiment. FIGS. 10A, 10B, 10C, 10D and 10E show aberrations occurred in the lens arrangement shown in FIG. 9.

Table 5 shows the numerical data of the fifth embodiment when an object at infinity is in an in-focus state.

The negative first sub-lens group 11 includes a positive meniscus lens element (a positive F1 lens element) having the convex surface facing toward the object and a negative meniscus lens element (a negative F2 lens element) having the convex surface facing toward the object, in this order from the object. Note that on the object-side surface of the negative meniscus lens element, an aspherical layer made of a compound resin material is formed.

The positive second sub-lens group 12 includes a negative meniscus lens element (a negative F3 lens element) having the convex surface facing toward the object, and a positive meniscus lens element (a positive F4 lens element) having the convex surface toward the object, in this order from the object.

The positive rear lens group 20 includes cemented lens elements having a positive meniscus lens element (a positive R1 lens element) having the convex surface toward the image and a negative biconcave lens element (a negative R2 lens element), a positive meniscus lens element (a positive R3 lens element) having the convex surface facing toward the image, and a positive meniscus lens element (a positive R4 lens element) having the convex surface facing toward the image, in this order from the object.

The diaphragm S is provided 3.68 behind the positive second sub-lens group 12 (surface No. 9).

TABLE 5

F = 1:3.3
f = 21.60
W = 35.0
fB = 38.52

| Surf. No. | r | d | Nd | ν |
|---|---|---|---|---|
| 1 | 65.020 | 1.90 | 1.66672 | 48.3 |
| 2 | 393.172 | 0.10 | – | – |
| 3* | 18.258 | 0.15 | 1.52972 | 42.7 |
| 4 | 16.938 | 1.10 | 1.80400 | 46.6 |
| 5 | 7.650 | 4.23 | – | – |

TABLE 5-continued

F = 1:3.3
f = 21.60
W = 35.0
fB = 38.52

| Surf. No. | r | d | Nd | ν |
|---|---|---|---|---|
| 6 | 25.571 | 1.20 | 1.77250 | 49.6 |
| 7 | 10.183 | 1.42 | — | — |
| 8 | 14.055 | 3.28 | 1.80518 | 25.4 |
| 9 | 1551.792 | 4.93 | — | — |
| 10 | −6615.794 | 2.32 | 1.53172 | 48.9 |
| 11 | −17.530 | 1.50 | 1.80518 | 25.4 |
| 12 | 43.071 | 0.53 | — | — |
| 13 | −255.095 | 2.97 | 1.49700 | 81.6 |
| 14 | −11.269 | 0.10 | — | — |
| 15 | −91.438 | 2.08 | 1.69680 | 55.5 |
| 16 | −19.360 | — | — | — |

The symbol * designates the aspherical surface which is rotationally symmetrical with respect to the optical axis.
Aspherical surface data (the aspherical surface coefficients not indicated are zero (0.00)):

| Surf. No. | K | A4 | A6 | A8 |
|---|---|---|---|---|
| 3 | 0.00 | $0.31989 \times 10^{-4}$ | $-0.32959 \times 10^{-7}$ | $0.11620 \times 10^{-8}$ |

Embodiment 6

Figure 11:
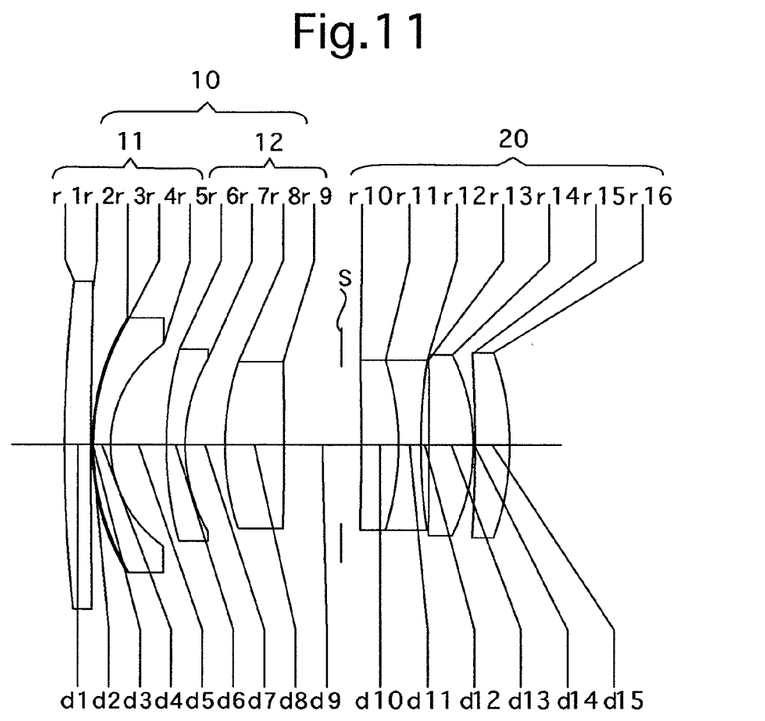
FIG. 11 is a lens arrangement of the wide-angle lens system according to a sixth embodiment of the present invention.
Figures 12A, 12B, 12C:
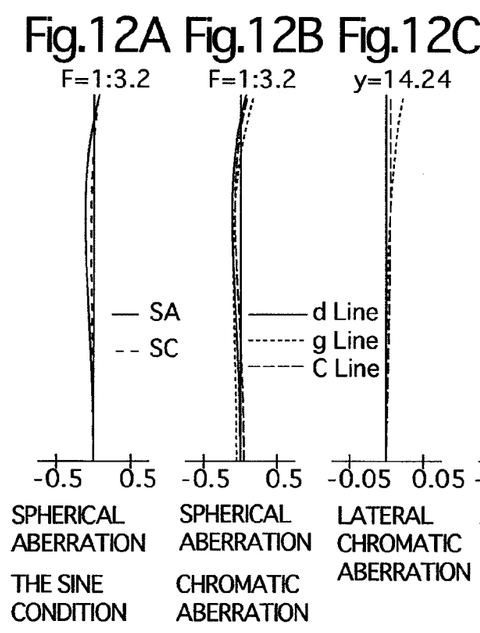
FIGS. 12A, 12B, 12C, 12D and 12E show aberrations occurred in the lens arrangement shown in FIG. 11.
Figures 12D, 12E:
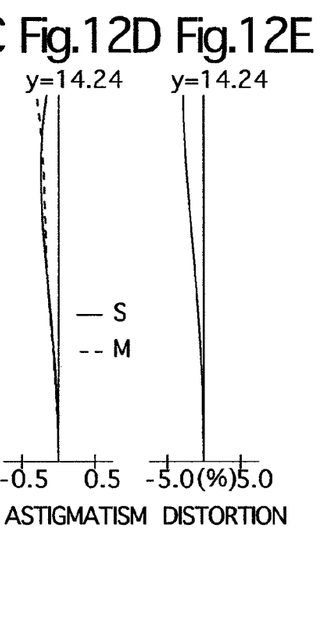

FIG. 11 is the lens arrangement of the wide-angle lens system according to the sixth embodiment. FIGS. 12A, 12B, 12C, 12D and 12E show aberrations occurred in the lens arrangement shown in FIG. 11.

Table 6 shows the numerical data of the sixth embodiment when an object at infinity is in an in-focus state.

The positive second sub-lens group 12 includes a negative meniscus lens element (a negative F3 lens element) having the convex surface facing toward the object, and a positive biconvex lens element (a positive F4 lens element), in this order from the object.

The remaining lens arrangement of the sixth embodiment is the same as that of the fifth embodiment.

The diaphragm S is provided 3.66 behind the positive second sub-lens group 12 (surface No. 9).

TABLE 6

F = 1:3.3
f = 21.60
W = 35.0
fB = 37.82

| Surf. No. | r | d | Nd | ν |
|---|---|---|---|---|
| 1 | 99.992 | 1.68 | 1.66672 | 48.3 |
| 2 | 730.173 | 0.08 | — | — |
| 3* | 17.237 | 0.07 | 1.52972 | 42.7 |
| 4 | 15.816 | 1.10 | 1.80400 | 46.6 |
| 5 | 7.900 | 3.59 | — | — |
| 6 | 23.598 | 1.20 | 1.77250 | 49.6 |
| 7 | 11.205 | 2.57 | — | — |
| 8 | 17.162 | 3.81 | 1.80518 | 25.4 |
| 9 | −195.142 | 4.94 | — | — |
| 10 | 182.306 | 2.35 | 1.53172 | 48.9 |
| 11 | −18.295 | 1.40 | 1.80518 | 25.4 |
| 12 | 37.438 | 0.52 | — | — |
| 13 | −580.401 | 2.85 | 1.49700 | 81.6 |

TABLE 6-continued

F = 1:3.3
f = 21.60
W = 35.0
fB = 37.82

| Surf. No. | r | d | Nd | ν |
|---|---|---|---|---|
| 14 | −12.889 | 0.10 | — | — |
| 15 | −95.846 | 2.24 | 1.69680 | 55.5 |
| 16 | −17.479 | — | — | — |

The symbol * designates the aspherical surface which is rotationally symmetrical with respect to the optical axis.
Aspherical surface data (the aspherical surface coefficients not indicated are zero (0.00)):

| Surf. No. | K | A4 | A6 | A8 |
|---|---|---|---|---|
| 3 | 0.00 | $0.33350 \times 10^{-4}$ | $0.52093 \times 10^{-9}$ | $0.17459 - 10^{-8}$ |

Table 7 shows the numerical values of each condition for each embodiment.

TABLE 7

| | Embod. 1 | Embod. 2 | Embod. 3 | Embod. 4 | Embod. 5 | Embod. 6 |
|---|---|---|---|---|---|---|
| Cond. (1) | −0.35 | −0.17 | −0.11 | −0.12 | −0.32 | −0.45 |
| Cond. (2) | 0.80 | 0.84 | 0.81 | 0.90 | 0.93 | 0.81 |
| Cond. (3) | −0.40 | −0.48 | −0.53 | −0.64 | −0.61 | −0.43 |
| Cond. (4) | 81.61 | 70.21 | 70.21 | 81.61 | 81.61 | 81.61 |
| Cond. (5) | 0.21 | 0.17 | 0.12 | 0.24 | 0.23 | 0.23 |

As can be understood from Table 7, the first through sixth embodiments satisfy conditions (1) through (5). Furthermore, as can be understood from the aberration diagrams, the various aberrations, especially coma aberration (astigmatism), distortion and chromatic aberration, are relatively well corrected.

According to the description, a high quality retrofocus wide-angle lens system with the following features can be attained:

(i) being thin (miniaturized) in the optical axis direction;
(ii) coma, distortion and chromatic aberration are suitably corrected; and
(iii) achieving an angle-of-view of approximately 70°.

What is claimed is:

1. A wide-angle lens system comprises a negative front lens group and a positive rear lens group, in this order from an object,
   wherein said negative front lens group comprises a negative first sub-lens group and a positive second sub-lens group, in this order from the object;
   wherein said positive rear lens group comprises cemented lens elements having a positive R1 lens element and a negative R2 lens element, a positive R3 lens element having a convex surface facing toward the image, and a positive R4 lens element, in this order from the object; and
   wherein said wide-angle lens system satisfies the following conditions:

$-0.8 < f1a/f1b < -0.1$ $0.6 < f/fR < 1.1$ wherein f1a designates the focal length of said negative first sub-lens group;

f1b designates the focal length of said positive second sub-lens group;

f designates the focal length of the entire wide-angle lens system; and fR designates the focal length of said positive rear lens group.

2. The wide-angle lens system according to claim 1, further satisfying the following condition:

$-0.7 < fR/fF < -0.1$ wherein fF designates the focal length of said negative front lens group; and fR designates the focal length of said positive rear lens group.

3. The wide-angle lens system according to claim 1, wherein said negative first sub-lens group comprises one positive lens element and one negative lens element; and wherein said positive second sub-lens group comprises one positive lens element and one negative lens element.

4. The wide-angle lens system according to claim 3, wherein in said negative first sub-lens group, said positive lens element and said negative lens element are arranged in this order from the object; and wherein in said positive second sub-lens group, said negative lens element and said positive lens element are arranged in this order from the object.

5. The wide-angle lens system according to claim 1, wherein said negative first sub-lens group comprises a positive F1 lens element having a convex surface facing toward the object and a negative F2 lens element, in this order from the object; and wherein said positive second sub-lens comprises a negative F3 lens element having a convex surface facing toward the object and a positive F4 lens element, in this order from the object.

6. The wide-angle lens system according to claim 1, further satisfying the following condition:

$vd1\text{-}7 > 70$ wherein vd1-7 designates the Abbe number of said positive R3 lens elements having a convex surface facing toward the image.

7. The wide-angle lens system according to claim 1, further satisfying the following condition:

$0.1 < d/f < 0.35$ wherein d designates the axial distance between said negative front lens group and said positive rear lens group.

8. The wide-angle lens system according to claim 1, wherein a diaphragm is provided between said negative front lens group and said positive rear lens group.

* * * * *